US012651120B2

(12) United States Patent
Bharadwaj et al.

(10) Patent No.: US 12,651,120 B2
(45) Date of Patent: Jun. 9, 2026

(54) ARTIFICIAL INTELLIGENCE DEVICE FOR COMMON SENSE REASONING FOR VISUAL QUESTION ANSWERING AND CONTROL METHOD THEREOF

(71) Applicant: LG ELECTRONICS INC., Seoul (KR)

(72) Inventors: Manasa Bharadwaj, Toronto (CA); Homa Fashandi, Toronto (CA)

(73) Assignee: LG ELECTRONICS INC., Seoul (KR)

( * ) Notice: Subject to any disclaimer, the term of this patent is extended or adjusted under 35 U.S.C. 154(b) by 218 days.

(21) Appl. No.: 18/416,552

(22) Filed: Jan. 18, 2024

(65) Prior Publication Data

US 2024/0242029 A1      Jul. 18, 2024

Related U.S. Application Data

(60) Provisional application No. 63/439,615, filed on Jan. 18, 2023.

(51) Int. Cl.
*G06F 40/284*        (2020.01)
*G06F 40/40*          (2020.01)

(52) U.S. Cl.
CPC ............ *G06F 40/284* (2020.01); *G06F 40/40* (2020.01)

(58) Field of Classification Search
CPC ................................ G06F 40/284; G06F 40/40
See application file for complete search history.

(56) References Cited

U.S. PATENT DOCUMENTS

| | | | | |
|---|---|---|---|---|
| 10,032,072 | B1 * | 7/2018 | Tran ......................... | G06F 18/28 |
| 2016/0012105 | A1 * | 1/2016 | Chang ................... | G06F 16/248 |
| | | | | 707/706 |
| 2017/0076222 | A1 * | 3/2017 | Khapra ..................... | G06N 3/09 |
| 2023/0419652 | A1 * | 12/2023 | Tiong ..................... | G06N 3/045 |

OTHER PUBLICATIONS

Min, Recent Advances in Natural Language Processing via Large Pre-Trained Language Models: A Survey, 2021, arXiv, whole document (Year: 2021).*

(Continued)

*Primary Examiner* — Sonia L Gay
(74) *Attorney, Agent, or Firm* — Birch, Stewart, Kolasch & Birch, LLP

(57)        ABSTRACT

A method for controlling an artificial intelligence (AI) device can include receiving, via a processor in the AI device, an input image and a query related to the input image, generating, via the processor, an answer prompt template based on the query, the answer prompt template including a sentence containing a mask token located at a position corresponding to an answer within the sentence, and combining the query and the answer prompt template to generate a string of text including the mask token. Also, the method can further include inputting the string of text to a pre-trained mask language module (MLM) and generating a plurality of scores respectfully corresponding to a plurality of answers, each of the plurality of answers being a candidate for replacing the mask token, determining a selected answer among the plurality of answers based on the plurality of scores, and outputting the selected answer.

17 Claims, 7 Drawing Sheets

(56) References Cited

OTHER PUBLICATIONS

Song, CLIP Models are Few-shot Learners: Empirical Studies on VQA and Visual Entailment, 2022, arXiv, whole document (Year: 2022).*

Zhao, Pre-trained Language Models Can Be Fully Zero-Shot Learners, 2022, arXiV, whole document (Year: 2022).*

Ravi, VLC-BERT: Visual Question Answering with Contextualized Commonsense Knowledge, 2022, arXiv, whole document (Year: 2022).*

Chen, LaKo: Knowledge-driven Visual Question Answering via Late Knowledge-to-Text Injection, 2022, ACM, whole document (Year: 2022).*

Jacob Andreas et al., "Neural Module Networks" This CVPR paper is the Open Access version, provided by the Computer Vision Foundation, pp. 39-48.

Joshua Feldman et al. "Commonsense Knowledge Mining from Pretrained Models", Proceedings of the 2019 Conference on Empirical Methods in Natural Language Processing and the 9th International Joint Conference on Natural Language Processing, Nov. 3-7, 2019, pp. 1173-1178.

Tassilo Klein et al. "Attention Is (not) All You Need for Commonsense Reasoning" arXiv:1905.13497v1 [cs.CL] May 31, 2019, 6 pages.

Tom Young et al. "Augmenting End-to-End Dialogue Systems with Commonsense Knowledge", arXiv:1709.05453v3 [cs.A1] Feb. 12, 2018, 8 pages.

Trieu H. Trinh et al. "A Simple Method for Commonsense Reasoning" arXiv:1806.02847v2 [cs.A1], Sep. 26, 2019, 12 pages.

Zhi-Xiu Ye et al. "Align, Mask and Select: A Simple Method for Incorporating Commonsense Knowledge into Language Representation Models", arXiv:1908.06725v5 [cs.CL], May 6, 2020, 10 pages.

* cited by examiner

100

180

110 — Communication unit    Processor    Memory — 170

120 — Input unit    Output unit — 150

130 — Learning Processor    Sensing unit — 140

100    210    260

AI Device    Communication unit    Processor    Learning Processor — 240

200

Memory — 230

Model storage unit — 231

Receive input image and query — S500

Generate answer prompt template — S502

Generate text including mask token — S504

Generate scores based on MLM — S506

Determine an answer based on scores — S508

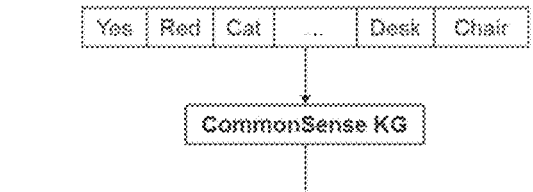

| CATEGORY | ANSWERS |
|---|---|
| ANIMAL | dog , cat , horse , bear , cow , sheep , chicken , bird , bat , zoo , duck , fish , pig , squirrel , rabbit ,camel , moose |
| FRUIT | orange , apple , lemon , pineapple , grape , fruit , lime , berry , peach , raspberry , produce , seed |
| A COLOR | black , blue , brown , green , red , color , orange , yellow , pink , purple |
| FURNITURE | chair , table , bed , desk , wood , cabinet , bookcase |
| JEWELRY | silver , ring , necklace , earring , crown , jewelry , necklaces |
| ... | ... |

ARTIFICIAL INTELLIGENCE DEVICE FOR COMMON SENSE REASONING FOR VISUAL QUESTION ANSWERING AND CONTROL METHOD THEREOF

CROSS-REFERENCE TO RELATED APPLICATIONS

This non-provisional application claims priority under 35 U.S.C. § 119(e) to U.S. Provisional Application No. 63/439,615, filed on Jan. 18, 2023, the entirety of which is hereby expressly incorporated by reference into the present application.

BACKGROUND

Field

The present disclosure relates to a device and method for commonsense reasoning for visual question answering, in the field of artificial intelligence (AI). Particularly, the method can provide commonsense reasoning and commonsense scoring for answer choices for visual question answering, in the AI field.

Discussion of the Related Art

Artificial intelligence (AI) continues to transform various aspects of society and helps users more efficiently retrieve information whether in the form of textual question and answering systems, recommendations systems, or visual question answering (VQA).

While AI has revolutionized various fields, visual question answering (VQA) confronts significant challenges, particularly in the realm of commonsense reasoning. One issue is the struggle to imbue VQA models with a nuanced understanding of the world, context, and implicit knowledge. Commonsense reasoning involves grasping the inherent, often unspoken, knowledge that humans possess and utilizing it to answer questions intelligently. VQA systems, however, often fall short in this regard.

The intricacies of commonsense reasoning become apparent when VQA models encounter questions that necessitate a deeper understanding of everyday scenarios. For instance, a seemingly straightforward question like "What kind of furniture is the napkin on?" may stump a VQA system or slow it down and be resource intensive, if it lacks the ability to draw upon common knowledge and infer that a napkin is typically placed on certain types of home furnishings (e.g., kitchen furniture) or inanimate objects, rather than on an animal or on a bathroom fixture, for example. VQA models often waste time and resources considering all possible answers and all kinds of candidates, even if it involves nonsensical possibilities that defy common sense.

These challenges arise from the inherent difficulty in embedding a broad and contextual understanding of the world into computational models. As a result, VQA systems may provide inaccurate or nonsensical answers when faced with queries that demand a level of comprehension beyond the explicit content present in training data. For example, training data often fails to explicitly mention or highlight the obvious.

Tackling these challenges is crucial for advancing the reliability and real-world applicability of VQA systems, as it requires models to possess a more sophisticated grasp of common knowledge and contextual understanding.

Thus, there exist a need for improving performance of visual question answering (VQA) systems by instilling common sense or world knowledge.

In addition, there exists a need for better eliminating answers that are obviously wrong or non-sensical, and allowing for continuous integration of ever-changing world knowledge into VQA systems.

In addition, there exists a need for a scalable approach for improving performance of visual question answering (VQA) systems that improves latency, reduces resource utilization, reduces hallucinations and errors, which can also help accelerate the adoption of AI technologies across diverse fields.

SUMMARY OF THE DISCLOSURE

The present disclosure has been made in view of the above problems and it is an object of the present disclosure to provide a device and method that can provide a device and method for commonsense reasoning for visual question answering, in the field of artificial intelligence (AI). Further, the method can provide sequence to sequence answer prompt generation, commonsense scoring, and common sense based rescoring for visual question answering.

An object of the present disclosure to provide a method for controlling an artificial intelligence (AI) device that includes receiving, via a processor in the AI device, an input image and a query related to the input image, generating, via the processor, an answer prompt template based on the query, the answer prompt template including a sentence containing a mask token located at a position corresponding to an answer within the sentence, combining, via the processor, the query and the answer prompt template to generate a string of text including the mask token, inputting, via the processor, the string of text to a pre-trained mask language module (MLM) and generating a plurality of scores respectfully corresponding to a plurality of answers, each of the plurality of answers being a candidate for replacing the mask token, determining, via the processor, a selected answer among the plurality of answers based on the plurality of scores, and outputting, via the processor, the selected answer.

It is another object of the present disclosure to provide a method for controlling an artificial intelligence (AI) device that includes inputting, via the processor, the plurality of answers to a commonsense knowledge graph, and generating, via the processor, a plurality of categories for the plurality of answers based on an output of the commonsense knowledge graph.

An object of the present disclosure is to provide a method for controlling an artificial intelligence (AI) device, in which at least one answer among the plurality of answers corresponds to two or more categories among the plurality of categories.

Another object of the present disclosure is to provide a method that includes normalizing, via the processor, the plurality of scores based on categories associated with the plurality of answers to generate normalized scores, in which the determining the selected answer is based on the categories or the normalized scores.

An object of the present disclosure is to provide a method that includes filtering answers from among the plurality of answers based on the categories to generate a subset of answers, and determining the selected answer by choosing an answer among the subset of answers.

Another object of the present disclosure is to provide a method that includes computing new scores for the plurality of answers based on a first type of score assigned to each category among the categories and a second type of score assigned by a visual question answering (VQA) model, and determining the selected answer by choosing an answer among the plurality of answers that has a highest score among the new scores.

Yet another object of the present disclosure is to provide a method in which the categories include one or more of a genre, a biological classification, a botanical classification, a material type, a media type, a content type, a design type, a model type, a size, a clothing type, a color, and an attribute.

An object of the present disclosure is to provide a method that includes training, via the processor, a sequence-to-sequence (Seq2Seq) answer prompt generation module based on a data set including input and output data pairs to generate a trained Seq2Seq answer prompt generation module, in which the trained Seq2Seq answer prompt generation module is configured to receive user queries and output answer prompt templates.

Another object of the present disclosure is to provide a method in which the Seq2Seq answer prompt generation module includes an encoder and a decoder.

An object of the present disclosure is to provide a method in which each of the plurality of scores is a probability value indicating a probability that the corresponding answer belongs at a location corresponding to the mask token.

An object of the present disclosure is to provide an artificial intelligence (AI) device for providing recommendations that includes a memory configured to store answer information, and a controller configured to receive an input image and a query related to the input image, generate an answer prompt template based on the query, the answer prompt template including a sentence containing a mask token located at a position corresponding to an answer within the sentence, combine the query and the answer prompt template to generate a string of text including the mask token, input the string of text to a pre-trained mask language module (MLM) and generate a plurality of scores respectfully corresponding to a plurality of answers, each of the plurality of answers being a candidate for replacing the mask token, determine a selected answer among the plurality of answers based on the plurality of scores, and output the selected answer.

In addition to the objects of the present disclosure as mentioned above, additional objects and features of the present disclosure will be clearly understood by those skilled in the art from the following description of the present disclosure.

BRIEF DESCRIPTION OF THE DRAWINGS

The above and other objects, features, and advantages of the present disclosure will become more apparent to those of ordinary skill in the art by describing example embodiments thereof in detail with reference to the attached drawings, which are briefly described below.

FIG. 3 illustrates an AI device according to an embodiment of the present disclosure.

FIG. 8 shows an example of assigning categories to answers according to an embodiment of the present disclosure.

DETAILED DESCRIPTION OF THE EMBODIMENTS

Figure 1:
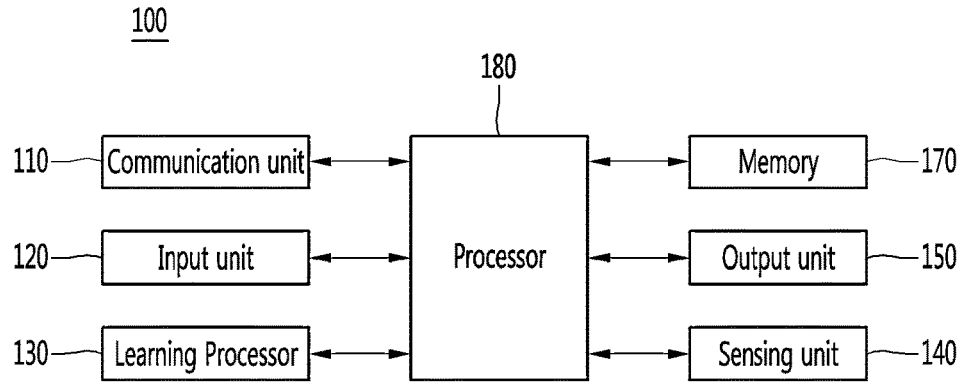
FIG. 1 illustrates an AI device according to an embodiment of the present disclosure.

Reference will now be made in detail to the embodiments of the present disclosure, examples of which are illustrated in the accompanying drawings.

Wherever possible, the same reference numbers will be used throughout the drawings to refer to the same or like parts.

Advantages and features of the present disclosure, and implementation methods thereof will be clarified through following embodiments described with reference to the accompanying drawings.

The present disclosure can, however, be embodied in different forms and should not be construed as limited to the embodiments set forth herein.

Rather, these embodiments are provided so that this disclosure will be thorough and complete, and will fully convey the scope of the present disclosure to those skilled in the art.

A shape, a size, a ratio, an angle, and a number disclosed in the drawings for describing embodiments of the present disclosure are merely an example, and thus, the present disclosure is not limited to the illustrated details.

Like reference numerals refer to like elements throughout. In the following description, when the detailed description of the relevant known function or configuration is determined to unnecessarily obscure the important point of the present disclosure, the detailed description will be omitted.

In a situation where "comprise," "have," and "include" described in the present specification are used, another part can be added unless "only" is used. The terms of a singular form can include plural forms unless referred to the contrary.

In construing an element, the element is construed as including an error range although there is no explicit description. In describing a position relationship, for example, when a position relation between two parts is described as "on," "over," "under," and "next," one or more other parts can be disposed between the two parts unless 'just' or 'direct' is used.

In describing a temporal relationship, for example, when the temporal order is described as "after," "subsequent," "next," and "before," a situation which is not continuous can be included, unless "just" or "direct" is used.

It will be understood that, although the terms "first," "second," etc. can be used herein to describe various elements, these elements should not be limited by these terms.

These terms are only used to distinguish one element from another. For example, a first element could be termed a second element, and, similarly, a second element could be termed a first element, without departing from the scope of the present disclosure.

Further, "X-axis direction," "Y-axis direction" and "Z-axis direction" should not be construed by a geometric relation only of a mutual vertical relation and can have broader directionality within the range that elements of the present disclosure can act functionally.

The term "at least one" should be understood as including any and all combinations of one or more of the associated listed items.

For example, the meaning of "at least one of a first item, a second item and a third item" denotes the combination of all items proposed from two or more of the first item, the second item and the third item as well as the first item, the second item or the third item.

Features of various embodiments of the present disclosure can be partially or overall coupled to or combined with each other and can be variously inter-operated with each other and driven technically as those skilled in the art can sufficiently understand. The embodiments of the present disclosure can be carried out independently from each other or can be carried out together in co-dependent relationship.

Hereinafter, the preferred embodiments of the present disclosure will be described in detail with reference to the accompanying drawings. All the components of each device or apparatus according to all embodiments of the present disclosure are operatively coupled and configured.

Artificial intelligence (AI) refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and can mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network can include an input layer, an output layer, and optionally one or more hidden layers. Each layer includes one or more neurons, and the artificial neural network can include a synapse that links neurons to neurons. In the artificial neural network, each neuron can output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network can be to determine the model parameters that minimize a loss function. The loss function can be used as an index to determine optimal model parameters in the learning process of the artificial neural network.

Machine learning can be classified into supervised learning, unsupervised learning, and reinforcement learning according to a learning method.

The supervised learning can refer to a method of learning an artificial neural network in a state in which a label for learning data is given, and the label can mean the correct answer (or result value) that the artificial neural network must infer when the learning data is input to the artificial neural network. The unsupervised learning can refer to a method of learning an artificial neural network in a state in which a label for learning data is not given. The reinforcement learning can refer to a learning method in which an agent defined in a certain environment learns to select a behavior or a behavior sequence that maximizes cumulative compensation in each state.

Machine learning, which can be implemented as a deep neural network (DNN) including a plurality of hidden layers among artificial neural networks, is also referred to as deep learning, and the deep learning is part of machine learning. In the following, machine learning is used to mean deep learning.

Self-driving refers to a technique of driving for oneself, and a self-driving vehicle refers to a vehicle that travels without an operation of a user or with a minimum operation of a user.

For example, the self-driving can include a technology for maintaining a lane while driving, a technology for automatically adjusting a speed, such as adaptive cruise control, a technique for automatically traveling along a predetermined route, and a technology for automatically setting and traveling a route when a destination is set.

The vehicle can include a vehicle having only an internal combustion engine, a hybrid vehicle having an internal combustion engine and an electric motor together, and an electric vehicle having only an electric motor, and can include not only an automobile but also a train, a motorcycle, and the like.

At this time, the self-driving vehicle can be regarded as a robot having a self-driving function.

FIG. 1 illustrates an artificial intelligence (AI) device 100 according to one embodiment.

The AI device 100 can be implemented by a stationary device or a mobile device, such as a television (TV), a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like. However, other variations are possible.

Referring to FIG. 1, the AI device 100 can include a communication unit 110 (e.g., transceiver), an input unit 120 (e.g., touchscreen, keyboard, mouse, microphone, etc.), a learning processor 130, a sensing unit 140 (e.g., one or more sensors or one or more cameras), an output unit 150 (e.g., a display or speaker), a memory 170, and a processor 180 (e.g., a controller).

The communication unit 110 (e.g., communication interface or transceiver) can transmit and receive data to and from external devices such as other AI devices 100a to 100e and the AI server 200 (e.g., FIGS. 2 and 3) by using wire/wireless communication technology. For example, the communication unit 110 can transmit and receive sensor information, a user input, a learning model, and a control signal to and from external devices.

The communication technology used by the communication unit 110 can include GSM (Global System for Mobile communication), CDMA (Code Division Multi Access), LTE (Long Term Evolution), 5G, WLAN (Wireless LAN), Wi-Fi (Wireless-Fidelity), BLUETOOTH, RFID (Radio Frequency Identification), Infrared Data Association (IrDA), ZIGBEE, NFC (Near Field Communication), and the like.

The input unit 120 can acquire various kinds of data.

At this time, the input unit 120 can include a camera for inputting a video signal, a microphone for receiving an audio signal, and a user input unit for receiving information from a user. The camera or the microphone can be treated as a sensor, and the signal acquired from the camera or the microphone can be referred to as sensing data or sensor information.

The input unit 120 can acquire a learning data for model learning and an input data to be used when an output is acquired by using a learning model. The input unit 120 can acquire raw input data. In this situation, the processor 180 or the learning processor 130 can extract an input feature by preprocessing the input data.

The learning processor 130 can learn a model composed of an artificial neural network by using learning data. The learned artificial neural network can be referred to as a learning model. The learning model can be used to infer a result value for new input data rather than learning data, and the inferred value can be used as a basis for determination to perform a certain operation.

At this time, the learning processor 130 can perform AI processing together with the learning processor 240 of the AI server 200.

At this time, the learning processor 130 can include a memory integrated or implemented in the AI device 100. Alternatively, the learning processor 130 can be implemented by using the memory 170, an external memory directly connected to the AI device 100, or a memory held in an external device.

The sensing unit 140 can acquire at least one of internal information about the AI device 100, ambient environment information about the AI device 100, and user information by using various sensors.

Examples of the sensors included in the sensing unit 140 can include a proximity sensor, an illuminance sensor, an acceleration sensor, a magnetic sensor, a gyro sensor, an inertial sensor, an RGB sensor, an IR (infrared) sensor, a fingerprint recognition sensor, an ultrasonic sensor, an optical sensor, a camera, a microphone, a lidar, and a radar.

The output unit 150 can generate an output related to a visual sense, an auditory sense, or a haptic sense.

At this time, the output unit 150 can include a display unit for outputting time information, a speaker for outputting auditory information, and a haptic module for outputting haptic information.

The memory 170 can store data that supports various functions of the AI device 100. For example, the memory 170 can store input data acquired by the input unit 120, learning data, a learning model, a learning history, and the like.

The processor 180 can determine at least one executable operation of the AI device 100 based on information determined or generated by using a data analysis algorithm or a machine learning algorithm. The processor 180 can control the components of the AI device 100 to execute the determined operation. For example, the processor 180 can execute a commonsense reasoning method for visual question answering.

To this end, the processor 180 can request, search, receive, or utilize data of the learning processor 130 or the memory 170. The processor 180 can control the components of the AI device 100 to execute the predicted operation or the operation determined to be desirable among the at least one executable operation.

When the connection of an external device is required to perform the determined operation, the processor 180 can generate a control signal for controlling the external device and can transmit the generated control signal to the external device.

The processor 180 can acquire information for the user input and can determine an answer or a recommended item or action based on the acquired intention information.

The processor 180 can acquire the information corresponding to the user input by using at least one of a speech to text (STT) engine for converting speech input into a text string or a natural language processing (NLP) engine for acquiring intention information of a natural language.

At least one of the STT engine or the NLP engine can be configured as an artificial neural network, at least part of which is learned according to the machine learning algorithm. At least one of the STT engine or the NLP engine can be learned by the learning processor 130, can be learned by the learning processor 240 of the AI server 200 (see FIG. 2), or can be learned by their distributed processing.

The processor 180 can collect history information including user profile information, the operation contents of the AI device 100 or the user's feedback on the operation and can store the collected history information in the memory 170 or the learning processor 130 or transmit the collected history information to the external device such as the AI server 200. The collected history information can be used to update the learning model.

The processor 180 can control at least part of the components of AI device 100 to drive an application program stored in memory 170. Furthermore, the processor 180 can operate two or more of the components included in the AI device 100 in combination to drive the application program.

Figure 2:
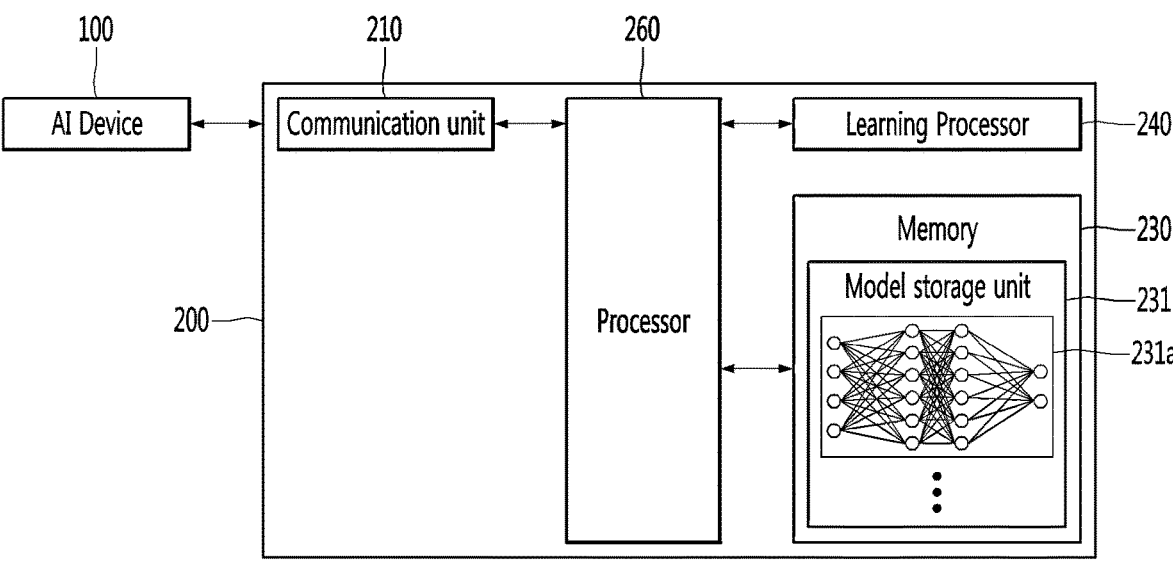
FIG. 2 illustrates an AI server according to an embodiment of the present disclosure.

FIG. 2 illustrates an AI server according to one embodiment.

Referring to FIG. 2, the AI server 200 can refer to a device that learns an artificial neural network by using a machine learning algorithm or uses a learned artificial neural network. The AI server 200 can include a plurality of servers to perform distributed processing, or can be defined as a 5G network, 6G network or other communications network. At this time, the AI server 200 can be included as a partial configuration of the AI device 100, and can perform at least part of the AI processing together.

The AI server 200 can include a communication unit 210, a memory 230, a learning processor 240, a processor 260, and the like.

The communication unit 210 can transmit and receive data to and from an external device such as the AI device 100.

The memory 230 can include a model storage unit 231. The model storage unit 231 can store a learning or learned model (or an artificial neural network 231a) through the learning processor 240.

The learning processor 240 can learn the artificial neural network 231a by using the learning data. The learning model can be used in a state of being mounted on the AI server 200 of the artificial neural network, or can be used in a state of being mounted on an external device such as the AI device 100.

The learning model can be implemented in hardware, software, or a combination of hardware and software. If all or part of the learning models are implemented in software, one or more instructions that constitute the learning model can be stored in the memory 230.

The processor 260 can infer the result value for new input data by using the learning model and can generate a response or a control command based on the inferred result value.

Figure 3:
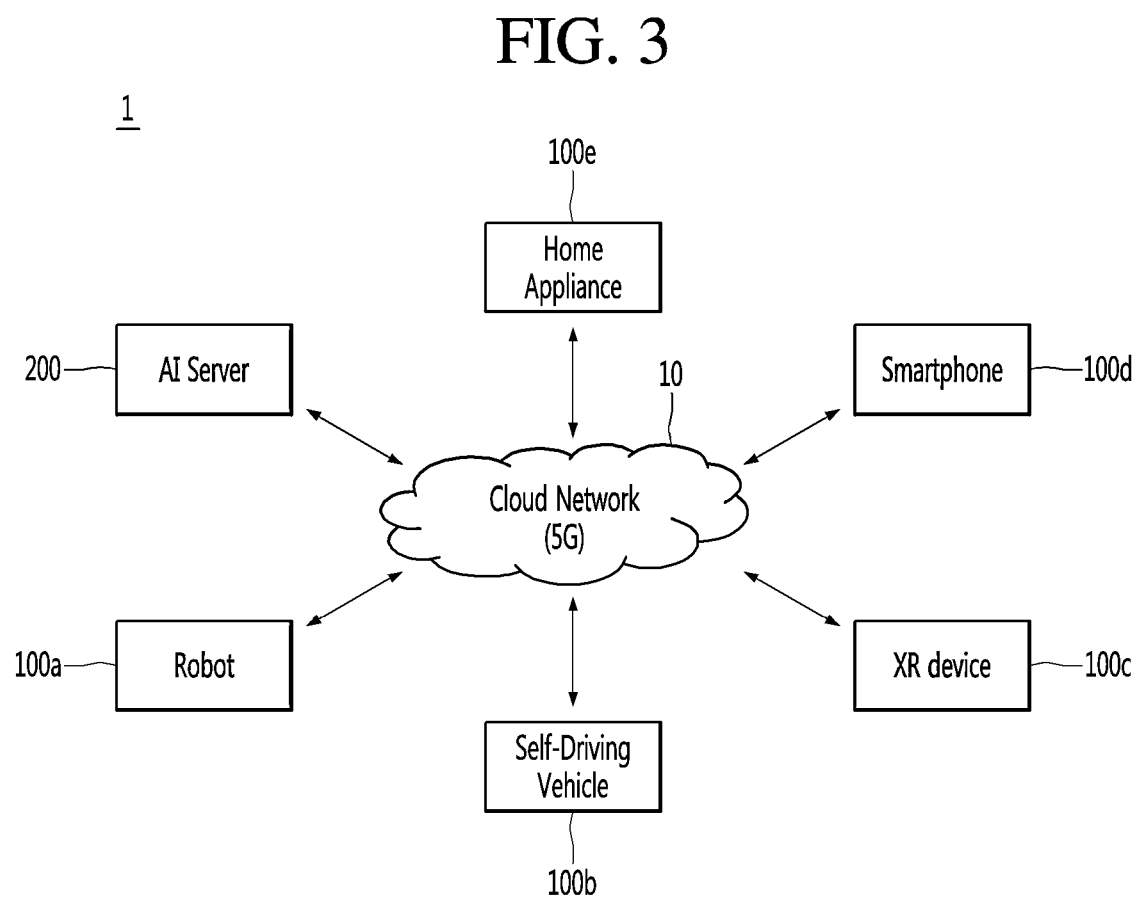

FIG. 3 illustrates an AI system 1 including a terminal device according to one embodiment.

Referring to FIG. 3, in the AI system 1, at least one of an AI server 200, a robot 100a, a self-driving vehicle 100b, an XR (extended reality) device 100*c*, a smartphone 100*d*, or a home appliance 100*e* is connected to a cloud network 10. The robot 100*a*, the self-driving vehicle 100*b*, the XR device 100*c*, the smartphone 100*d*, or the home appliance 100*e*, to which the AI technology is applied, can be referred to as AI devices 100*a* to 100*e*. The AI server 200 of FIG. 3 can have the configuration of the AI server 200 of FIG. 2.

According to an embodiment, the commonsense reasoning method can be implemented as an application or program that can be downloaded or installed in the smartphone 100*d*, which can communicate with the AI server 200, but embodiments are not limited thereto.

The cloud network 10 can refer to a network that forms part of a cloud computing infrastructure or exists in a cloud computing infrastructure. The cloud network 10 can be configured by using a 3G network, a 4G or LTE network, a 5G network, a 6G network, or other network.

For instance, the devices 100*a* to 100*e* and 200 configuring the AI system 1 can be connected to each other through the cloud network 10. In particular, each of the devices 100*a* to 100*e* and 200 can communicate with each other through a base station, but can directly communicate with each other without using a base station.

The AI server 200 can include a server that performs AI processing and a server that performs operations on big data.

The AI server 200 can be connected to at least one of the AI devices constituting the AI system 1, that is, the robot 100*a*, the self-driving vehicle 100*b*, the XR device 100*c*, the smartphone 100*d*, or the home appliance 100*e* through the cloud network 10, and can assist at least part of AI processing of the connected AI devices 100*a* to 100*e*.

At this time, the AI server 200 can learn the artificial neural network according to the machine learning algorithm instead of the AI devices 100*a* to 100*e*, and can directly store the learning model or transmit the learning model to the AI devices 100*a* to 100*e*.

At this time, the AI server 200 can receive input data from the AI devices 100*a* to 100*c*, can infer the result value for the received input data by using the learning model, can generate a response or a control command based on commonsense reasoning and the inferred result value, and can transmit the response or the control command to the AI devices 100*a* to 100*e*. Each AI device 100*a* to 100*e* can have the configuration of the AI device 100 of FIGS. 1 and 2 or other suitable configurations.

Alternatively, the AI devices 100*a* to 100*e* can infer the result value for the input data by directly using the learning model, and can generate the response or the control command based on the inference result.

Hereinafter, various embodiments of the AI devices 100*a* to 100*e* to which the above-described technology is applied will be described. The AI devices 100*a* to 100*e* illustrated in FIG. 3 can be regarded as a specific embodiment of the AI device 100 illustrated in FIG. 1.

According to an embodiment, the home appliance 100*e* can be a smart television (TV), smart microwave, smart oven, smart refrigerator or other display device, which can implement one or more of a commonsense reasoning method, a question and answering system or a recommendation system. The method can be the form of an executable application or program.

The robot 100*a*, to which the AI technology is applied, can be implemented as an entertainment robot, a guide robot, a carrying robot, a cleaning robot, a wearable robot, a pet robot, an unmanned flying robot, or the like.

The robot 100*a* can include a robot control module for controlling the operation, and the robot control module can refer to a software module or a chip implementing the software module by hardware.

The robot 100*a* can acquire state information about the robot 100*a* by using sensor information acquired from various kinds of sensors, can detect (recognize) surrounding environment and objects, can generate map data, can determine the route and the travel plan based on commonsense reasoning, can determine the response to user interaction, or can determine the operation.

The robot 100*a* can use the sensor information acquired from at least one sensor among the lidar, the radar, and the camera to determine the travel route and the travel plan.

The robot 100*a* can perform the above-described operations by using the learning model composed of at least one artificial neural network. For example, the robot 100*a* can recognize the surrounding environment and the objects by using the learning model, and can determine the operation by using the recognized surrounding information or object information. The learning model can be learned directly from the robot 100*a* or can be learned from an external device such as the AI server 200.

At this time, the robot 100*a* can perform the operation by generating the result by directly using the learning model, but the sensor information can be transmitted to the external device such as the AI server 200 and the generated result can be received to perform the operation.

The robot 100*a* can use at least one of the map data, the object information detected from the sensor information, or the object information acquired from the external apparatus to determine the travel route and the travel plan, and can control the driving unit such that the robot 100*a* travels along the determined travel route and travel plan. Further, the robot 100*a* can determine, based commonsense reasoning, an action to pursue or an item to recommend. Also, the robot 100*a* can generate an answer in response to a user query. The answer can be in the form of natural language.

The map data can include object identification information about various objects arranged in the space in which the robot 100*a* moves. For example, the map data can include object identification information about fixed objects such as walls and doors and movable objects such as pollen and desks. The object identification information can include a name, a type, a distance, and a position.

In addition, the robot 100*a* can perform the operation or travel by controlling the driving unit based on the control/interaction of the user. At this time, the robot 100*a* can acquire the intention information of the interaction due to the user's operation or speech utterance, and can determine the response based on the acquired intention information and commonsense reasoning, and can perform the operation.

The robot 100*a*, to which the AI technology and the self-driving technology are applied, can be implemented as a guide robot, a carrying robot, a cleaning robot (e.g., an automated vacuum cleaner), a wearable robot, an entertainment robot, a pet robot, an unmanned flying robot (e.g., a drone or quadcopter), or the like.

The robot 100*a*, to which the AI technology and the self-driving technology are applied, can refer to the robot itself having the self-driving function or the robot 100*a* interacting with the self-driving vehicle 100*b*.

The robot 100*a* having the self-driving function can collectively refer to a device that moves for itself along the given movement line without the user's control or moves for itself by determining the movement line by itself.

The robot 100*a* and the self-driving vehicle 100*b* having the self-driving function can use a sensing method to determine at least one of the travel route or the travel plan. For example, the robot 100*a* and the self-driving vehicle 100*b* having the self-driving function can determine at least one of the travel route or the travel plan by using the information sensed through the lidar, the radar, and the camera.

The robot 100*a* that interacts with the self-driving vehicle 100*b* exists separately from the self-driving vehicle 100*b* and can perform operations interworking with the self-driving function of the self-driving vehicle 100*b* or interworking with the user who rides on the self-driving vehicle 100*b*.

In addition, the robot 100*a* interacting with the self-driving vehicle 100*b* can control or assist the self-driving function of the self-driving vehicle 100*b* by acquiring sensor information on behalf of the self-driving vehicle 100*b* and providing the sensor information to the self-driving vehicle 100*b*, or by acquiring sensor information, generating environment information or object information, and providing the information to the self-driving vehicle 100*b*.

Alternatively, the robot 100*a* interacting with the self-driving vehicle 100*b* can monitor the user boarding the self-driving vehicle 100*b*, or can control the function of the self-driving vehicle 100*b* through the interaction with the user. For example, when it is determined that the driver is in a drowsy state, the robot 100*a* can activate the self-driving function of the self-driving vehicle 100*b* or assist the control of the driving unit of the self-driving vehicle 100*b*. The function of the self-driving vehicle 100*b* controlled by the robot 100*a* can include not only the self-driving function but also the function provided by the navigation system or the audio system provided in the self-driving vehicle 100*b*.

Alternatively, the robot 100*a* that interacts with the self-driving vehicle 100*b* can provide information or assist the function to the self-driving vehicle 100*b* outside the self-driving vehicle 100*b*. For example, the robot 100*a* can provide traffic information including signal information and the like, such as a smart signal, to the self-driving vehicle 100*b*, and automatically connect an electric charger to a charging port by interacting with the self-driving vehicle 100*b* like an automatic electric charger of an electric vehicle.

According to an embodiment, the AI device 100 can provide commonsense reasoning and commonsense scoring for answer choices for visual question answering.

According to another embodiment, the AI device 100 can be integrated into an infotainment system of the self-driving vehicle 100*b*, which can recommend content or provide answers based on various input modalities, the content can include one or more of audio recordings, images, video, music, pod casts, etc., but embodiments are not limited thereto. Also, the AI device 100 can be integrated into an infotainment system of the manual or human-driving vehicle.

In addition, an object of the present disclosure is to provide a commonsense reasoning (CSR) module and AI device that can compute common sense scores (CSS) for all answer choices available for the task of visual question answering (VQA). This can be integrated with various VQA applications, such as chatbots, interactive education systems, a guidance system for visually impaired users, a self-driving system etc., to improve performance by imbibing commonsense or world knowledge.

Visual Question Answering (VQA) tasks need textual comprehension, a facet involving commonsense reasoning (CSR). Unlike humans who can dismiss obvious answer choices for a question even before viewing an image, current VQA systems lack this ability. Presently, these systems often consider all answers as equally plausible for every question.

Enhancing performance entails encouraging the model to prioritize plausible and valid answers, thereby improving overall accuracy.

In the Visual Question Answering (VQA) task, the system is presented with both an image and a natural language question pertaining to the image. Its objective is to produce a response in the form of a natural language answer. Successfully accomplishing this task necessitates a comprehensive understanding of both the user's query and the contents of the image, encompassing the vast array of potential answers. Various approaches, such as classification and/or generation, can be employed, according to embodiments.

In the classification approach, the system operates within the confines of a predefined set of answers and needs to select the most appropriate one as the response. While this method can be straightforward to train, it can have limitations in terms of the available answer choices. Conversely, in the generation approaches, the system generates an answer directly using the model's vocabulary, freeing it from the constraints of a predefined answer set.

However, training a generation model may face challenges as the signal for training might not be as robust due to the succinct nature of answers available in research datasets. Thus, the AI device 100 can be configured with a method for commonsense reasoning that can use a type of classification approach, but embodiments are not limited thereto.

The assessment of VQA task performance primarily revolves around answer accuracy, gauging the model's ability to predict the correct response. Supplementary metrics, such as validity and plausibility, also contribute to the evaluation.

Validity scrutinizes whether the model provides answers that are theoretically correct for a given question (e.g., indicating color for questions related to color). On the other hand, plausibility assesses the reasonableness of the model's responses in real-world scenarios. For instance, in a question about the color of an apple, colors like green and red are considered plausible since they are attributes found in some apples across the dataset, while colors like blue or purple are deemed implausible due to their absence in the dataset.

Language Modeling is a type pretraining task within the Natural Language Processing domain. According to embodiments, this task can encompass two types of approaches: Auto-Regressive Language Modeling and Masked Language Modeling (MLM).

In Auto-Regressive Language Modeling, the model can be trained to predict the next word in a sequence given a contextual framework. For example, when presented with the input "Orange is a," the model can be trained to generate the subsequent word, potentially predicting "fruit." Consequently, the model acquires the ability to discern patterns based on previous context, incrementally generates text, one word at a time, until the generation of the End-of-Sequence (EOS) token.

In the Masked Language Modeling (MLM) approach, the model is presented with a sentence in which certain words are masked, and its task is to generate an appropriate replacement for the masked word. For example, when provided with the input "Orange is a [MASK] fruit," the model is expected to output a word like "citrus," resulting in the sentence "Orange is a citrus fruit." Also, language models can also have auxiliary tasks as well.

However, to understand certain challenging data points, a model may need information beyond the patterns discerned from its training data in pattern recognition. In the realm of Question Answering, which includes Visual Question Answering (VQA), the model can enhance the likelihood of generating plausible answers by leveraging knowledge about the world. Here, this capacity is referred to as commonsense reasoning (CSR).

The AI device 100 can use language models that generate a probability distribution across the complete vocabulary utilized during their training. Language models trained on human-written natural language text, which describes the world, can acquire commonsense knowledge about various aspects of the world.

For example, P(red|the color of apple is)>>P(orange|the color of apple is) is what is expected from a capable language model, where P is the probability. This behavior can be viewed as learning commonsense as apples in the world are not usually orange in color.

According to embodiments, the AI device 100 can use language models that can provide four different types of scores for a given sentence, as follows. Regular probability score. $P(w_t|w_1, \ldots, w_{t-1})$, which is the probability of a word given the context of previous words. Full score, $P(w_1, \ldots, w_{t-1}, w_{t|1} \ldots w_n)$, can be viewed as the probability of a sentence consisting of n tokens, which can be considered a product of a regular probability score for each word in the sentence. Partial score, $P(w_{t+1}, \ldots, w_n|w_1, \ldots, w_{t-1}, w_t)$, which can be viewed as the probability of the sentence after the pivot word $(w_t)$, which is computed similarly to the full score, where each word's probability after the pivot word given the context is multiplied. Self-attention/Attention Weight, in which the self-attention mechanism used in the transformer encoder introduced forces attention heads to learn intra sentence relations. A combination of relevant attention weights for the word of interest $(w_t)$ can compute an attention-based score.

According to an embodiment, the AI device 100 can include one or more knowledge graphs that include entities and properties or information about people or items (e.g., names, user IDs), products (e.g., display devices, home appliances, etc.), profile information (e.g., age, gender, weight, location, etc.), recipe categories, ingredients, images, purchases and reviews.

According to an embodiment, a knowledge graph can capture real world knowledge in the form of a graph structure modeled as (h, r, t) triplets where h and t refer to a head entity and a tail entity respectively, and r is a relationship that connects the two entities.

Also, knowledge graph completion can refer to a process of filling in missing information in a knowledge graph, making it more comprehensive and accurate (e.g., similar to piecing together a puzzle, uncovering hidden connections and expanding the knowledge base). Link prediction can identify missing links in a knowledge graph (KG) and assist with downstream tasks such as question answering and recommendation systems.

Also, the AI device 100 can use one or more large language modules (LLMs) to perform entity linking (e.g., BERT), in which topic entities mentioned in a question are detected and linked to the correct knowledge base identifiers. The AI device 100 can use a stack of transformer encoders and decoders that are pretrained on language tasks and can support fine tuning and reinforcement learning. Alternatively, the AI device 100 can use long short-term memory networks (LSTMs).

Figure 4:
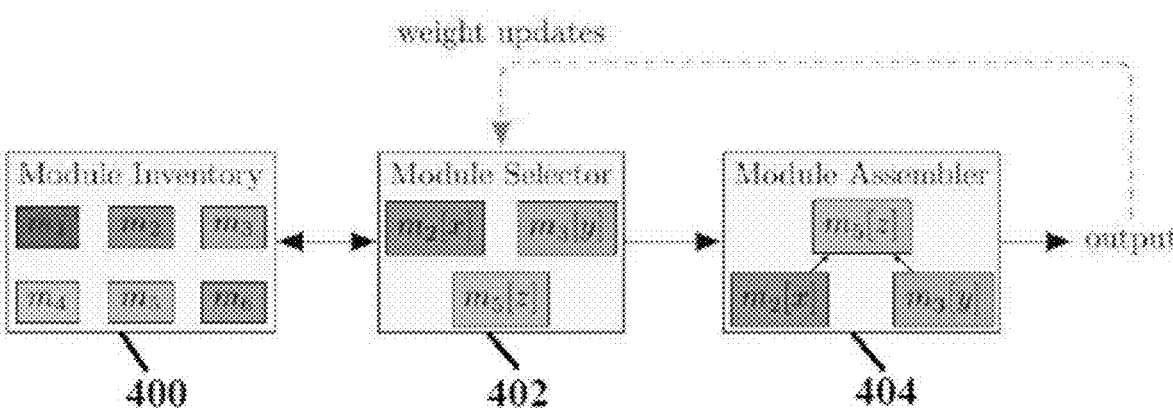
FIG. 4 shows an example of components of an AI device according to an embodiment of the present disclosure.

With reference to FIG. 4, the AI device 100 can use Neural Module Networks (NMN) to implement a complex task as a decomposition of simpler tasks. According to an embodiment, the AI device 100 can include a module inventory (e.g., 400), a module selector (e.g., 402), and a module assembler (e.g., 404). The module inventory can hold or store a number of predefined modules. For example, each module can be a specific neural network that implements an elemental task, e.g., FIND(object), SELECT(object), FILTER(object), VERIFY(attribute), etc.

The module selector can choose the relevant modules to decompose the composite task. The module selector can rely on linguistic information, such as the question (along with the input image), if applicable, to determine both the selected modules and their parameters. Also, the module selector can take the form of either a neural network or a rule-based system, but embodiments are not limited thereto.

Subsequently, the module assembler can construct a valid layout or composition by piecing together the chosen modules. For example, this involves connecting the smaller neural networks together in a meaningful way to create the neural module network. Both visual and linguistic information can serve as the input to this assembled neural network. This iterative process can continue for different training samples, each of which can have a distinct composite architecture. During inference time, a composite neural network tailored to the sample, potentially unobserved during training, can be built for each sample.

Figure 5:
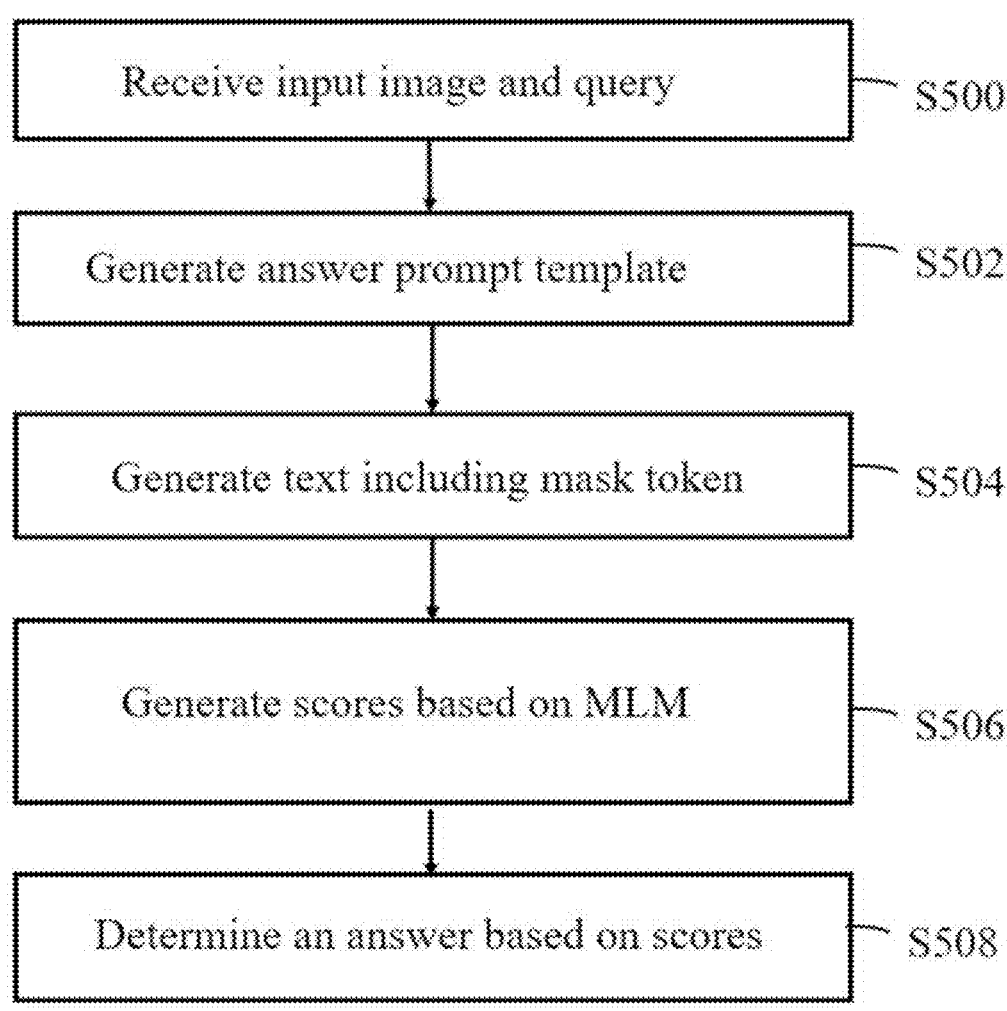
FIG. 5 shows an example flow chart of a method according to an embodiment of the present disclosure.

FIG. 5 shows an example flow chart of a method according to an embodiment.

Referring to FIG. 5, for example, the AI device 100 can be configured with a method that includes receiving, via a processor in the AI device, an input image and a query related to the input image (e.g., step S500), generating, via the processor, an answer prompt template based on the query, the answer prompt template including a sentence containing a mask token located at a position corresponding to an answer within the sentence (e.g., step S502), and combining the query and the answer prompt template to generate a string of text including the mask token (e.g., step S504). In addition, the method can further include inputting the string of text to a pre-trained mask language module (MLM) and generating a plurality of scores respectfully corresponding to a plurality of answers, each of the plurality of answers being a candidate for replacing the mask token (e.g., step S506), determining a selected answer among the plurality of answers based on the plurality of scores (e.g., step S508), and outputting the selected answer.

Figure 6:
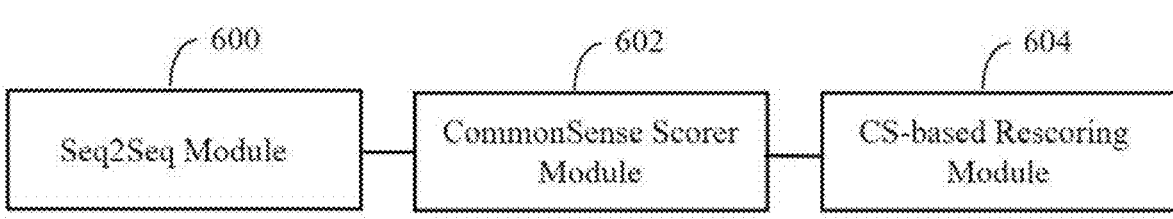
FIG. 6 shows an example of components of an AI device according to an embodiment of the present disclosure.

As illustrated in the example shown in FIG. 6, the AI device 100 can include a Sequence to Sequence (Seq2Seq) Answer Prompt Generation module 600, a CommonSense Scorer (CSS) module 602, and a CommonSense-based Rescoring module 604. According to embodiments, the AI device 100 can include a commonsense reasoning (CSR) module or device that includes one or more of the Sequence to Sequence (Seq2Seq) Answer Prompt Generation module 600, the CommonSense Scorer (CSS) module 602, and the CommonSense-based Rescoring module 604.

Figure 7:
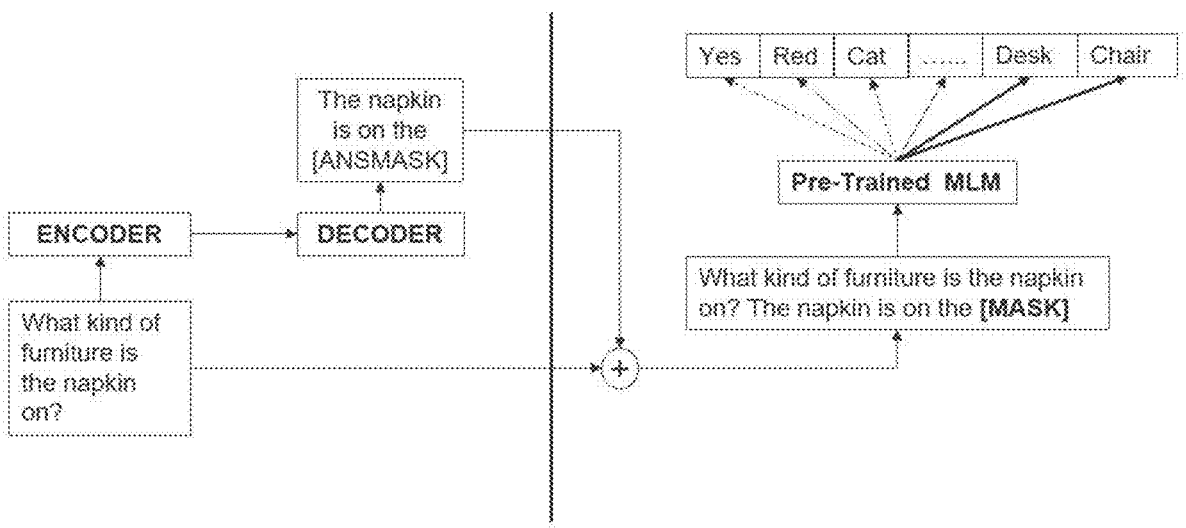
FIG. 7 illustrates an example inference pipeline according to an embodiment of the present disclosure.

FIG. 7 illustrates an example inference pipeline for computing the CommonSense Score (CSS). Referring to FIG. 7, for example, the Sequence to Sequence (Seq2Seq) Answer Prompt Generation module 500 can include an encoder and a decoder.

According to an embodiment, initiating the process can include feeding the question into the encoder of the Sequence to Sequence (Seq2Seq) Answer Prompt Generation module 500, which can be custom-trained. The encoder then produces a latent representation, which is subsequently input into the decoder model.

According to embodiments, the latent representation can include numerical vector capturing the essence of the sentence's meaning, grammatical structure, and relationships between words, without being tied to a specific language, but embodiments are not limited thereto. The latent representation can include word embeddings, encoder hidden states, a self-attention mechanism to weight different parts of the input sequence, and/or positional encoding. Also, the Seq2Seq Answer Prompt Generation module 500 can include a stack of encoder and decoder layers.

For example, the Sequence to Sequence (Seq2Seq) Answer Prompt Generation module 500 can include a transformer. The transformer can operate on the attention mechanism and can capture relationships between different parts of the input sequence without relying on sequential processing. The transformer can include an encoder and a decoder, each of which can include multiple layers that can be stacked. During training, the model learns to attend to relevant parts of the input sequence, enabling it to capture long-range dependencies and improve performance. The Seq2Seq Answer Prompt Generation module 600 can pre-trained on a predetermined dataset.

As shown in FIG. 7, the decoder model can generate an AnswerPrompt, which is a sentence containing a special mask token [ANSMASK] at the answer's position or location within the sentence. In the example presented in FIG. 7, the AnswerPrompt can include a complete sentence including the mask token, e.g., the AnswerPrompt is "The napkin is on the [ANSMASK]."

In other words, the Sequence to Sequence (Seq2Seq) Answer Prompt Generation model 600 can receive a user query and generate a masked answer template for the user query. This masked answer template can be used to help focus or guide the system to look for commonsense answers that have a high probability of replacing the place holder [ANSMASK].

With reference to FIGS. 6 and 7, the AnswerPrompt template output by the Seq2Seq) Answer Prompt Generation model 600 and the original user query can be input to the CommonSense Scorer (CSS) module 602.

Upon receiving the AnswerPrompt template and the user query, the CommonSense Scorer (CSS) module 602 can combine the two items to create a query and answer pair or a combination of sentences. This combination of the input question and the AnswerPrompt is input to a pre-trained Masked Language Model (MLM) and the [ANSMASK] is replaced with the [MASK] token before running MLM inference.

The pre-trained Masked Language Model (MLM) can use self-supervised learning techniques that train language models to predict missing words in text. For example, the MLM can perform a masking operation of selecting a portion of words in an input text and replacing them with a special token (e.g., [MASK]). The MLM is tasked with predicting the original identities of the masked words, using the remaining unmasked words and its understanding of language.

According to an embodiment, the MLM can be trained on a large corpus of text where certain words are randomly masked or replaced. The MLM can predict the masked words based on the context provided by the surrounding words. Also, the MLM can be fine-tuned to minimize the difference between its predictions and the actual masked words. In this way, the MLM can learn to capture contextual relationships between words, semantic meanings, and grammatical structures. The MLM can use a multi-layer transformer architecture.

The MLM can generate probabilities for every word in the vocabulary representing the possibility of the word being the masked word. Since the answer vocabulary is limited, the probabilities are extracted for only the VQA answer vocabulary.

For handling multiword answers, the CommonSense Scorer (CSS) module 602 including the MLM can tokenize the multiword answer using the MLM tokenizer, e.g. giraffe>(gira, ##ffe), computer desk>(computer, desk). Then, the CSS module 602 can create a prompt with multiple [MASK] tokens to represent each sub-word, e.g., "The napkin is on the [MASK] [MASK]." Further, the CSS module 602 calculates the probabilities of the words (gira, ##ffe) and (computer, desk) for the respective [MASK] positions, and combines these probabilities to represent the probability of the answer.

Once probabilities are computed for all predefined answers, the top-K answers can be chosen as plausible answers based on commonsense reasoning. Here, K is an integer indicating the number of top results chosen. K is a hyper parameter that can be chosen based on experimentation, but embodiments are not limited thereto.

In this situation, once the CSS module 602 computes the probability for each answer, these scores can be used to select the best answer. According to an embodiment, the CSS module 502 can select the answer that has the highest probability value among the top results.

In addition, the probabilities computed by the CSS module 602 for each of the top-K answers can be used in different ways, according to embodiments.

According to an embodiment, the CSS module 602 can apply a ranking approach that includes combining the probabilities of the top-K answers with existing VQA pipeline's output logits/probabilities to re-rank all the answers by leveraging commonsense signals. For example, the CSS module 602 can a new score for each answer based on two scores, e.g., the probability computed by the CSS module 602 and the probability computed by an existing VQA pipeline's output. In this way, answers corresponding to the top-K answers provided by the CSS module 502 can be boosted or the system can be biased towards selecting one of the top-K answers.

According to another embodiment, the CSS module 602 can apply a filtering approach that uses these signals for filtering answers through majority voting. For example, answers among the top-K answers having a computed probability that is less than a predetermined value can be filtered out, but embodiment are not limited thereto.

According to an embodiment, majority voting can include training an ensemble of diverse models, and then letting them "vote" on an answer. The majority vote wins, leading to more accurate and stable predictions than any single model could achieve.

However, two issues may remain regarding possible low coverage and non-uniform scoring. For example, there may be a low coverage issue that does not guarantee coverage of all plausible answers. Also, there may be a non-uniform scoring issue in which plausible answers receive different probability scores even when the scoring should be uniform. For example, for the question "What color is the child's jacket?," the scoring should be equal or relatively equal or uniform for all colors, since the given information is insufficient to make an informed guess beyond the answer type (e.g., color).

According to an embodiment, the AI device 100 can be further augmented with the CommonSense-based Rescoring module 604. The CommonSense-based Rescoring module 604 can use a commonsense knowledge graph (CS-KG) based answer generation.

As shown in FIG. 8, an object type or category is derived for every answer within the VQA answer vocabulary by referencing a commonsense knowledge graph (KG), and the answers are categorized into groups based on their respective types. For example, the object type or category can include one or more of a genre, a biological classification, a botanical classification, material type, media type, content type, design type, model type, size type, clothing type, color, attribute, etc. Furthermore, each answer can be associated with more than one type or more than one category, e.g., a dog can be classified under both the animal category and the pet category. For example, an answer can have one-to-many mapping to different categories.

The CommonSense-based Rescoring module 604 can execute a scoring procedure for adjusting or computing the scores of each answer.

The scoring procedure can include two main steps, but embodiment are not limited thereto. For example, the CommonSense-based Rescoring module 604 can compute a group score for the category/group with the best answer's common sense score (CSS) (answer with the maximum CSS in the group), e.g., CSS(color)=MAX (CSS (red, blue, yellow, etc.).

Then, in a second step, the CommonSense-based Rescoring module 604 can perform rescoring by scoring every answer in the given category with the category score, e.g., CSS(red)=CSS(yellow)= . . . =CSS(color). In other words, the CommonSense-based Rescoring module 604 can take the maximum score computed from the CSS module 602 that is found among answers belonging to a same group or category, and then apply that maximum score to all the answers included in that same group or category.

In this way, the CommonSense-based Rescoring module 604 can provide a normalization operation. For example, the scores for answers within the same group or category are all normalized to the same maximum score found within that group that was computed by the CSS module 602. According to this approach, for the question "What color is the child's jacket?," the scores will be normalized for all available colors, since the given information is insufficient to make an informed guess beyond the answer type (e.g., color).

Then, the AI device 100 can combine the normalized scores from the CommonSense-based Rescoring module 604 with the VQA model scores, and select the answer having the highest score and return that answer to the user.

According to embodiments, scores from the CommonSense-based Rescoring module 604 and scores from the VQA model can be combined in different ways. For example, the two different types of scores can be weighted differently, etc.

Also, a method for controlling an artificial intelligence (AI) device can include receiving, via a processor in the AI device, an input image and a query related to the input image, generating, via the processor, an answer prompt template based on the query, the answer prompt template including a sentence containing a mask token located at a position corresponding to an answer within the sentence, and combining the query and the answer prompt template to generate a string of text including the mask token. In addition, the method can further include inputting the string of text to a pre-trained mask language module (MLM) and generating a plurality of scores respectfully corresponding to a plurality of answers, each of the plurality of answers being a candidate for replacing the mask token, determining a selected answer among the plurality of answers based on the plurality of scores, and outputting the selected answer.

Further, the AI device 100 including the commonsense reasoning (CSR) module can be deployed in a recommendation system or a visual question and answering system.

Also, world knowledge is dynamic, constantly evolving alongside shifts in what is deemed common sense. Embodiments of the present disclosure can facilitate the seamless incorporation of ever-changing global knowledge into VQA systems, employing both zero-shot and fine-tuning methodologies.

According to an embodiment, the AI device 100 implementing the commonsense reasoning can use Masked Language Modelling (MLM) predictions for mask tokens using batch inference for all possible answers, making the task more efficient.

In addition, the AI device 100 implementing the commonsense reasoning can use a commonsense knowledge graph (KG) to create answer categories and to provide uniform scoring per group. In this way, retraining or fine-tuning can be avoided or reduced.

Further, according to an embodiment, the AI device 100 implementing the commonsense reasoning can integrate commonsense into different types of VQA applications. It can also be used for classification-based question answering applications with a predetermined set of answer vocabulary.

Also, periodic updates to the knowledge graph can result in modifications to answer categories, thereby incorporating such changes into the VQA pipeline. For instance, the discovery of a new precious metal might prompt an update to the jewelry section, allowing AI device 100 implementing the commonsense reasoning to consider that metal as a plausible answer. The commonsense reasoning method is scalable to answer vocabulary changes. For instance, a VQA system that answers questions about a smart fridge's contents needs to update its vocabulary as and when new items are released in the market or adopt anomalies or changes in users' shopping habits.

According to an embodiment, the AI device 100 can be configured to answer user queries and/or recommend items (e.g., home appliance devices, mobile electronic devices, movies, content, advertisements or display devices, etc.), options or routes to a user. The AI device 100 can be used in various types of different situations.

According to one or more embodiments of the present disclosure, the AI device 100 can solve one or more technological problems in the existing technology, such as improving performance of visual question answering (VQA) systems by instilling common sense or world knowledge.

Also, according to one or more embodiments of the present disclosure, the AI device 100 can solve one or more technological problems in the existing technology by better eliminating answers that are obviously wrong or non-sensical, and allowing for continuous integration of ever-changing world knowledge into VQA systems.

According to one or more embodiments of the present disclosure, the AI device 100 can solve one or more technological problems in the existing technology by providing a scalable approach for improving performance of visual question answering (VQA) systems that improves latency, reduces resource utilization, and reduces hallucinations and errors.

Various aspects of the embodiments described herein can be implemented in a computer-readable medium using, for example, software, hardware, or some combination thereof. For example, the embodiments described herein can be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, other electronic units designed to perform the functions described herein, or a selective combination thereof. In some cases, such embodiments are implemented by the controller. That is, the controller is a hardware-embedded processor executing the appropriate algorithms (e.g., flowcharts) for performing the described functions and thus has sufficient structure. Also, the embodiments such as procedures and functions can be implemented together with separate software modules each of which performs at least one of functions and operations. The software codes can be implemented with a software application written in any suitable programming language. Also, the software codes can be stored in the memory and executed by the controller, thus making the controller a type of special purpose controller specifically configured to carry out the described functions and algorithms. Thus, the components shown in the drawings have sufficient structure to implement the appropriate algorithms for performing the described functions.

Furthermore, although some aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM.

Computer programs based on the written description and methods of this specification are within the skill of a software developer. The various programs or program modules can be created using a variety of programming techniques. For example, program sections or program modules can be designed in or by means of Java, C, C++, assembly language, Perl, PHP, HTML, or other programming languages. One or more of such software sections or modules can be integrated into a computer system, computer-readable media, or existing communications software.

Although the present disclosure has been described in detail with reference to the representative embodiments, it will be apparent that a person having ordinary skill in the art can carry out various deformations and modifications for the embodiments described as above within the scope without departing from the present disclosure. Therefore, the scope of the present disclosure should not be limited to the aforementioned embodiments, and should be determined by all deformations or modifications derived from the following claims and the equivalent thereof.

What is claimed is:

1. A method for controlling an artificial intelligence (AI) device, the method comprising:

receiving, via a processor in the AI device, an input image and a query related to the input image;

generating, via the processor, an answer prompt template based on the query, the answer prompt template including a sentence containing a mask token located at a position corresponding to an answer within the sentence;

combining, via the processor, the query and the answer prompt template to generate a string of text including the mask token;

inputting, via the processor, the string of text to a pre-trained mask language module (MLM) and generating a plurality of scores respectfully corresponding to a plurality of answers, each of the plurality of answers being a candidate for replacing the mask token;

inputting, via the processor, the plurality of answers to a commonsense knowledge graph;

generating, via the processor, a plurality of categories for the plurality of answers based on an output of the commonsense knowledge graph, wherein at least one answer among the plurality of answers corresponds to two or more categories among the plurality of categories;

determining, via the processor, a selected answer among the plurality of answers based on the plurality of scores and the plurality of categories; and outputting, via the processor, the selected answer.

2. The method of claim 1, further comprising:

normalizing, via the processor, the plurality of scores based on categories associated with the plurality of answers to generate normalized scores, wherein the determining the selected answer is based on the categories or the normalized scores.

3. The method of claim 2, further comprising:

filtering answers from among the plurality of answers based on the categories to generate a subset of answers; and determining the selected answer by choosing an answer among the subset of answers.

4. The method of claim 2, further comprising:

computing new scores for the plurality of answers based on a first type of score assigned to each category among the categories and a second type of score assigned by a visual question answering (VQA) model; and determining the selected answer by choosing an answer among the plurality of answers that has a highest score among the new scores.

5. The method of claim 2, wherein the categories include one or more of a genre, a biological classification, a botanical classification, a material type, a media type, a content type, a design type, a model type, a size, a clothing type, a color, and an attribute.

6. The method of claim 1, further comprising:

training, via the processor, a sequence-to-sequence (Seq2Seq) answer prompt generation module based on a data set including input and output data pairs to generate a trained Seq2Seq answer prompt generation module, wherein the trained Seq2Seq answer prompt generation module is configured to receive user queries and output answer prompt templates.

7. The method of claim 6, wherein the Seq2Seq answer prompt generation module includes an encoder and a decoder, or a decoder only model.

8. The method of claim 1, wherein each of the plurality of scores is a probability value indicating a probability that the corresponding answer belongs at a location corresponding to the mask token.

9. An artificial intelligence (AI) device for providing recommendations, the AI device comprising:

a memory configured to store answer information; and a controller configured to:

receive an input image and a query related to the input image, generate an answer prompt template based on the query, the answer prompt template including a sentence containing a mask token located at a position corresponding to an answer within the sentence, combine the query and the answer prompt template to generate a string of text including the mask token, input the string of text to a pre-trained mask language module (MLM) and generate a plurality of scores respectfully corresponding to a plurality of answers, each of the plurality of answers being a candidate for replacing the mask token, input the plurality of answers to a commonsense knowledge graph, generate a plurality of categories for the plurality of answers based on an output of the commonsense knowledge graph, wherein at least one answer among the plurality of answers corresponds to two or more categories among the plurality of categories, determine a selected answer among the plurality of answers based on the plurality of scores and the plurality of categories, and output the selected answer.

10. The AI device of claim 9, wherein the controller is further configured to:

normalize the plurality of scores based on categories associated with the plurality of answers to generate normalized scores, wherein the selected answer is determined based on the categories or the normalized scores.

11. The AI device of claim 10, wherein the controller is further configured to:

filter answers from among the plurality of answers based on the categories to generate a subset of answers; and determine the selected answer by choosing an answer among the subset of answers.

12. The AI device of claim 10, wherein the controller is further configured to:

generate new scores for the plurality of answers based on a first type of score assigned to each category among the categories and a second type of score assigned by a visual question answering (VQA) model, and determine the selected answer by choosing an answer among the plurality of answers that has a highest score among the new scores.

13. The AI device of claim 10, wherein the categories include one or more of a genre, a biological classification, a botanical classification, a material type, a media type, a content type, a design type, a model type, a size, a clothing type, a color, and an attribute.

14. The AI device of claim 9, wherein the controller is further configured to:

train a sequence-to-sequence (Seq2Seq) answer prompt generation module based on a data set including input and output data pairs to generate a trained Seq2Seq answer prompt generation module, wherein the trained Seq2Seq answer prompt generation module is configured to receive user queries and output answer prompt templates.

15. The AI device of claim 14, wherein the Seq2Seq answer prompt generation module includes an encoder and a decoder, or a decoder only model.

16. The AI device of claim 9, wherein each of the plurality of scores is a probability value indicating a probability that the corresponding answer belongs at a location corresponding to the mask token.

17. A method for controlling an artificial intelligence (AI) device, the method comprising:

receiving, via a processor in the AI device, an input image and a query related to the input image;

generating, via the processor, an answer prompt template based on the query, the answer prompt template including a sentence containing a mask token located at a position corresponding to an answer within the sentence;

combining, via the processor, the query and the answer prompt template to generate a string of text including the mask token;

inputting, via the processor, the string of text to a pre-trained mask language module (MLM) and generating a plurality of scores respectfully corresponding to a plurality of answers, each of the plurality of answers being a candidate for replacing the mask token;

normalizing, via the processor, the plurality of scores based on categories associated with the plurality of answers to generate normalized scores;

computing, via the processor, new scores for the plurality of answers based on a first type of score assigned to each category among the categories and a second type of score assigned by a visual question answering (VQA) model;

determining, via the processor, a selected answer among the plurality of answers that has a highest score among the new scores; and outputting, via the processor, the selected answer.

\* \* \* \* \*